Patented Jan. 13, 1931

1,789,062

UNITED STATES PATENT OFFICE

EUGENE E. AYRES, JR., OF SWARTHMORE, PENNSYLVANIA, ASSIGNOR TO THE B. A. S. COMPANY, OF PHILADELPHIA, PENNSYLVANIA, A CORPORATION OF DELAWARE

RUBBER PROCESS AND PRODUCT

No Drawing. Application filed February 21, 1923. Serial No. 620,531.

This invention effects the treatment of rubber latex so that the rubber is extracted and mixed, without coagulation, with organic substances, to produce novel products, adapted for use in water proofing, electrical insulation, floor covering, paints, and varnishes, and in other products that could not be otherwise obtained excepting with greater difficulty and expense.

The improvements are characterized by the mixture of latex containing rubber in colloidal suspension as obtained from certain trees, with oils, fats, waxes, resins, liquid hydrocarbons or petroleum products, either actually or potentially in the form of emulsions with water as the continuous phase, in the absence of any substance that will tend to coagulate the rubber, resolving the emulsion and removing the water.

As the continuous medium of latex is water, it is miscible with water, aqueous solutions, and suspensions or emulsions of the type of oil-in-water. When oils are put in the form, actually or potentially, of an oil-in-water emulsion, latex may be mixed readily therewith, the rubber remaining disseminated therein in colloidal form provided no substance is present to cause the coagulation of the rubber. In this mixture, the colloidal rubber particles are in intimate contact with the oil and when this emulsion is resolved, the rubber is not coagulated in the usual sense, but is dispersed in the oil, or the oil is dispersed in the rubber, depending upon the relative quantities present.

The statement that the oil should be in a form that is either actually or potentially of the type of an oil-in-water emulsion may be illustrated, as to the potential type of oil-in-water, by a mixture of nine parts of linseed oil, one part of water and a fractional part of sodium soap. The sodium soap is a hydrophile colloid in the respect that it tends to produce an oil-in-water emulsion, but the excess of oil together with incomplete agitation leaves the emulsion in an intermediate form. Water soluble soaps do not cause coagulation of rubber in latex in the presence of free alkali and therefore I have used such substances in the preparation of my rubber solutions. But similar results can be secured by the use of other hydrophile colloids such as starches and gums. And the process is not restricted to the use of any hydrophile colloid as the latex contains a hydrophile colloid which stabilizes the rubber suspension as previously stated. Hence the desired intimate contact can be secured by the agitation of a pure oil with latex but the use of such material as soap as specified is generally very advantageous.

The term "solution," as used herein, is not limited to the molecular dispersion of the solute but in the broader sense that two phases may coexist colloidally in apparent homogeneity, because there appears to be no very certain knowledge of the nature of organic mixtures.

Rubber is considered to be a colloidal substance and solutions of rubber in organic solvents or solutions of organic materials in rubber are considered to be colloidal solutions.

The following examples are given as illustrations of the invention:

1. Dissolve 100 grams of sodium rosin soap (60% dry matter) in 500 c. c. of water; add 10 grams of latex (containing 30% rubber and a trace of ammonia) with thorough stirring; add enough hydrochloric acid to neutralize the free alkali and to decompose the rosin soap; boil the mixture with formation of viscous layer of rosin and rubber disseminated therethrough; remove the rosin and rubber mixture and dry the same in an oven to drive off the moisture. The product is a clear dry solution in viscous form and has properties that are not found in either constituent alone. When cooled and set it is tough, hard, does not absorb water to the same extent as rosin, and does not deteriorate readily. It can be used with oil and turpentine to produce varnish. It is suitable also for electrical insulation.

2. Dissolve 200 grams of sodium rosin soap (60% dry matter) in 500 c. c. of water; add 10 c. c. latex (30% rubber with trace of ammonia) with thorough stirring; add 500 c. c. neutral linseed oil and thoroughly emulsifying; acidulate with hydrochloric acid to neutralize alkali and soap; boil with formation of viscous layer of mixed linseed oil, rosin and rubber. The mixture is dried by heat, subsidence, or filtration with moisture absorbing substance. The product is a perfectly clear viscous solution with physical properties not found in any one of the constituents alone or in solutions of rosin and linseed oil. It is adapted for use in the manufacture of varnishes and enamels.

3. Treat 500 grams of linseed oil containing a small amount of free fatty acid with enough dilute aqeous ammonia to either neutralize or practically neutralize it, producing an emulsion stabilized by the ammonium soap; stir in, thoroughly, 15 c. c. latex (containing 30% rubber and trace of ammonia); boil until the ammonia is driven off and all the water evaporated. The product is a clear mixture of linseed oil and rubber which can be improved in color by treatment with fuller's earth. It is adapted for many uses including the manufacture of floor coverings, paints, waterproof coatings, patent leather enamels, and printing inks.

4. Thoroughly agitate 100 grams of toluol with 100 grams of latex. This emulsion is resolved by continuous vigorous agitation. The toluol appears to prevent the coagulation of the rubber in the usual sense and the separated material can be handled with greater mechanical facility than coagulated rubber, in the manufacture of products in which coagulated rubber is ultimately desired and in the preparation of solutions of rubber in solvents.

5. Thoroughly agitate 1 c. c. latex with 100 c. c. of a petroleum spindle oil, producing a thorough emulsion. Drive off the water from the mixture by heating. A complete incorporation of the rubber of the latex with the oil is more difficult by this treatment than in the presence of a small amount of an emulsifying agent such as sodium soap or starch, but when these assisting substances are used, it is necessary to get rid of the residual soap or starch after driving off the moisture. The product may be used as a lubricant.

I have found that the viscosity of a freshly made solution of rubber and linseed oil is very high. Continued heat at 100° C. with agitation by air blown therethrough for a period of say two hours causes a marked diminution of viscosity due to the flocculating action of the rubber. This product is itself a valuable varnish and can also be mixed with varnish resins such as copal for the production of varnishes.

It will be seen that while the process may be used variously and various products may be obtained, the operations common to the different forms of manufacture are the mixture of latex with organic substances so as to form an emulsion and the resolution of the emulsion; and the resulting manufactures have the common property found in a component of disseminated rubber that has not been coagulated.

Having described my invention, I claim:

1. The process which comprises the admixture of rubber, latex, soluble soap and oil, and acidulation to neutralize the alkali and decompose the soap.

2. The process which comprises the admixture of rubber latex with sodium resin soap dissolved in water, the acidulation of the mixture, and the separation from the product of the mixed resin and rubber.

3. The process which comprises the formation of an emulsion by mixing sodium rosin soap, rubber latex and linseed oil, acidulating the mixture, and separating out the mixed rosin, rubber and linseed oil.

4. The process which consists in combining rubber latex with linseed oil in dispersed phase and heating the same with agitation with air blown therethrough.

5. The process which comprises the formation of an emulsion by mixing a relatively greater proportion of drying oil with uncoagulated latex, evaporating water from the resulting emulsion in the absence of a coagulating agent, and thereby withdrawing from the resulting emulsion a homogeneous mixture which comprises rubber and linseed oil and is substantially free of water.

6. The product which comprises the mechanical mixture of rubber in non-coagulated form, soluble resin and linseed oil.

7. The process which comprises the emulsification of rubber latex, soluble resin soap and oil, and acidulation to neutralize the alkali of and decompose the soap.

8. The process which comprises the emulsification of rubber latex, sodium resin soap solution, the acidulation of the mixture, and the separation from the product of uncoagulated rubber mixed with resinous substance.

9. The process which comprises the emulsification of non-coagulated rubber latex, resinous substance and linseed oil, resolution of the emulsion, and separation from the mixture of non-coagulated rubber, resinous substance and linseed oil.

10. The process which comprises the emulsification of rubber latex, linseed oil, and sodium resin soap, acidulation of the mixture and separation therefrom of mixed rubber, oil, and resinous substances.

11. The process which consists in emulsifying a water dispersion of rubber with linseed oil, heating the same with agitation, and blowing air therethrough.

12. The product which comprises the mechanical mixture of latex in non-coagulated form, water soluble resinous soap, and linseed oil.

13. The process which comprises forming an emulsion comprising linseed oil, and a substantially lesser proportion of uncoagulated latex containing water, removing water from the resulting emulsion in the absence of a coagulating agent, and thereby withdrawing from the resulting emulsion a homogeneous mixture which comprises rubber and linseed oil and is substantially free of water.

In testimony whereof I have hereunto set my name this 16th day of February, 1923.

EUGENE E. AYRES, Jr.